United States Patent [19]

Sarem et al.

[11] Patent Number: 5,247,993
[45] Date of Patent: Sep. 28, 1993

[54] ENHANCED IMBIBITION OIL RECOVERY PROCESS

[75] Inventors: A. M. Sam Sarem, Yorba Linda; Richard D. Hutchins, Placentia; Shlomo R. Frieman, Placentia, all of Calif.

[73] Assignee: Union Oil Company of California, Los Angeles, Calif.

[21] Appl. No.: 899,636

[22] Filed: Jun. 16, 1992

[51] Int. Cl.$^5$ .................. E21B 43/22; E21B 43/24
[52] U.S. Cl. .................. 166/303; 166/305.1
[58] Field of Search ............. 166/263, 292, 293, 294, 166/303, 305.1

[56] References Cited

U.S. PATENT DOCUMENTS

| | | | |
|---|---|---|---|
| 2,354,203 | 7/1944 | Garrison | 166/303 X |
| 3,131,759 | 5/1964 | Slusser et al. | 166/305.1 |
| 3,527,303 | 9/1970 | Zwicky | 166/303 |
| 3,805,893 | 4/1974 | Sarem | 166/270 |
| 3,871,452 | 3/1975 | Sarem | 166/270 |
| 3,871,453 | 3/1975 | Sarem | 166/270 |
| 3,876,002 | 4/1975 | Sarem | 166/274 |
| 3,908,762 | 9/1975 | Redford | 166/263 |
| 3,948,323 | 4/1976 | Sperry et al. | 166/303 |
| 4,044,831 | 8/1977 | Allen | 166/275 |
| 4,187,185 | 2/1980 | Park et al. | 166/272 X |
| 4,191,249 | 3/1980 | Sarem | 166/279 X |
| 4,217,956 | 8/1980 | Goss et al. | 166/272 |
| 4,223,730 | 9/1980 | Schulz et al. | 166/272 |
| 4,441,555 | 4/1984 | Shu | 166/272 |
| 4,475,595 | 10/1984 | Watkins et al. | 166/303 |
| 4,523,642 | 6/1985 | Venkatesan | 166/272 |
| 4,532,052 | 7/1985 | Weaver et al. | 166/275 |
| 4,549,609 | 10/1985 | Watkins et al. | 166/303 |
| 4,572,296 | 2/1986 | Watkins | 166/303 |
| 4,589,487 | 5/1986 | Venkatesan et al. | 166/261 |
| 4,609,044 | 9/1986 | Lau | 166/270 |
| 4,660,641 | 4/1987 | Shen | 166/272 |
| 4,702,317 | 10/1987 | Shen | 166/272 |
| 4,714,112 | 12/1987 | Nigrini et al. | 166/252 |
| 4,719,972 | 1/1988 | Hsueh | 166/252 |
| 4,802,533 | 2/1989 | Hsueh et al. | 166/252 |
| 4,828,031 | 5/1989 | Davis | 166/274 X |
| 5,014,783 | 5/1991 | McClure | 166/274 X |
| 5,020,595 | 6/1991 | Van Slyke | 166/272 |
| 5,042,580 | 8/1991 | Cullick et al. | 166/273 X |

OTHER PUBLICATIONS

Leach et al., *Journal of Petroleum Technology*, Feb. 1962 (pp. 206–212), Tulsa, OK.
Michaels et al., *Petroleum Transactions*, AIME, vol. 219, 1960, (pp. 150–157), Cambridge, MA.
H. K. van Poollen and Associates, Inc. *Fundamentals of Enhanced Oil Recovery*, PennWell Publishing (1980), pp. 104–105.

*Primary Examiner*—George A. Suchfield
*Attorney, Agent, or Firm*—Gregory F. Wirzbicki; Shlomo R. Frieman

[57] ABSTRACT

Oil production from a fractured, oil-bearing subterranean formation is enhanced by sequentially injecting (i) a wettability reversal agent-containing fluid and (ii) an overflush fluid through a well and into the formation. The well is then place into production after allowing a sufficient period of time for (a) the matrix face of the formation to change from preferentially oil wet to preferentially water wet and (b) a displacing fluid (e.g., hot water, steam) to imbibe into the fractured matrix and displace the oil from the matrix into the fracture cracks.

20 Claims, No Drawings

ENHANCED IMBIBITION OIL RECOVERY PROCESS

BACKGROUND

The present invention relates to a method for enhancing the production of oil from a fractured, oil-bearing subterranean formation.

Due to current oil prices, it is essential that oil recovery techniques be as efficient as possible.

SUMMARY

Generally, when steam is injected into an oil-bearing subterranean formation, the steam is used to heat the formation and, thus, lower the viscosity of the oil for improved oil recovery. In fractured reservoirs, the steam is also employed to imbibe into the fractured matrix of the formation for the purpose of displacing the oil from the matrix into the fracture cracks. The displaced oil then moves to a well to be produced. The imbibition rate is much better when the matrix face is preferentially water wet, than when the matrix face is preferentially oil wet.

Accordingly, the present invention provides a method for improving the rate of imbibition in a fractured subterranean formation—and thus for enhancing the production of oil from the fractured formation—by changing the matrix face of the formation from preferentially oil wet to preferentially water wet. Specifically, the method of this invention comprises the sequential steps of (a) injecting a slug of a wettability reversal agent-containing fluid through a well and into at least a portion of a fractured, oil-bearing subterranean formation; (b) injecting a slug of an overflush fluid through the well and into at least a portion of the fractured, oil-bearing subterranean formation, the overflush fluid being capable of increasing the oil mobility and decreasing the water mobility in at least a portion of the fractured, oil-bearing subterranean formation; and (c) placing the well into production. As used in the specification and claims, the term "wettability reversal agent" means a composition capable of changing a surface from preferentially oil wet to preferentially water wet. Generally, after step (b), the well is shut in for a period of time prior to putting the well into production in step (c). In a preferred embodiment of the invention, the method further comprises the step (a.1) of injecting a hot aqueous fluid through the well and into at least a portion of the fractured, oil-bearing subterranean formation after step (a) but before step (b).

DETAILED DESCRIPTION OF THE INVENTION

In accordance with the method of the present invention, a slug of a wettability reversal agent-containing fluid is injected through a well into at least a portion of a fractured, oil-bearing subterranean formation. The subterranean formation treated by the method of the present invention is preferably extensively fractured. Extensively fractured subterranean formations include, but are not limited to, naturally or tectonically fractured subterranean formations.

The wettability reversal agent-containing fluid is preferably an aqueous-base fluid such as steam or an aqueous liquid (e.g., surface water, ground water, and brine). More preferably, the aqueous-base fluid is surface or ground water. When steam is employed as the base fluid, the steam generally has a steam quality of less than 100 percent. In addition, when the aqueous-base fluid is an aqueous liquid, the aqueous liquid preferably contains enough dissolved solids to avoid clay swelling in the formation upon injection of the liquid into the formation.

Exemplary wettability reversal agents employed in the injected fluid include, but are not limited to, alkaline alkali metal silicates, ammonium salts, alkali metal hydroxides, alkali metal tripolyphosphates, alkali metal carbonates, alkali metal bicarbonates, fluorinated surfactants, and nonionic surfactants. Preferred alkali metals are sodium and potassium. Sodium orthosilicate, potassium orthosilicate, sodium hydroxide, potassium hydroxide, sodium carbonate, and potassium carbonate are the preferred wettability reversal agents. Individual wettability reversal agents or combinations of different wettability reversal agents may be used in the invention.

The concentration of the wettability reversal agent in the injected fluid is sufficient for the liquid phase of the fluid to generally have a pH of at least about 11, preferably at least about 12, and more preferably at least about 13. The pH is determined by measuring the pH of a sample of the liquid phase of the fluid being injected into the formation. If steam having a steam quality of 100 percent is injected into the formation, a sample of the injected steam is condensed and the pH of the condensed liquid is measured.

The liquid volume of the injected wettability reversal agent-containing fluid varies based on the pore volume of the fractured, subterranean formation, the wettability reversal agent used, and the volume of the portion of the subterranean formation to be treated. As a rule of thumb, at least about 0.001 barrel of fluid is employed per cubic foot of fractured, subterranean formation to be treated. Preferably, at least about 0.0025, more preferably at least about 0.005, and even more preferably at least about 0.0075, and most preferably at least about 0.01, barrels of fluid are injected into the fractured, subterranean formation per cubic foot of formation to be treated. Generally, less than about 0.1, and preferably less than about 0.075, more preferably less than about 0.05, and even more preferably less than about 0.025, barrel of fluid is injected per cubic foot of fractured, subterranean formation to be treated. When steam is injected into the formation, the volume of injected fluid is determined by the amount of aqueous liquid employed in generating the steam.

After injecting the wettability reversal agent-containing fluid, a slug of an overflush fluid is injected through the well and into at least a portion of the fractured, oil-bearing subterranean formation. The overflush fluid is capable of increasing the oil mobility and decreasing the water mobility in at least a portion of the fractured, oil-bearing subterranean formation. Exemplary overflush fluids include, but are not limited to hydrocarbon oils (e.g., petroleum base liquids such as crude oil, kerosine, gas oil, and diesel oil). In addition, the petroleum base liquid optionally contains an oil-soluble thickening agent and a suspension of a solid particulate water-soluble thickening agent.

Exemplary oil-soluble thickening agents include, but are not limited to, polymethyl laurylate, polyalkyl styrene, polybutadiene, polyisobutylene, the bivalent and trivalent metallic soaps of monocarboxylic acids having 14 or more carbon atoms per molecule and powdered colloidal silicas which are fire dried fumed silicas having a surface area between 200 and 480 square meters per gram. The viscosity-average molecular weight of the above-described polymeric oil-soluble thickening agents is preferably about 50,000 to about 1,000,000. Generally, when used, the oil-soluble thickening agent is employed in a concentration sufficient to increase the viscosity of the petroleum base liquid about fourfold at reservoir temperature and pressure. Generally, such a viscosity is achieved by using about 0.2 to about 2 weight percent oil-soluble thickening agent.

Typical water-soluble thickening agents include, but are not limited to, water-soluble polymers such as polyacrylamide, partially hydrolyzed polyacrylamide, polyacrylic acid, polyvinyl alcohol, polyvinyl pyrrolidone, polystyrene sulfonate, polyethylene oxide, and a heteropolysaccharide produced by bacteria of the genus Xanthomonas; cellulose derivatives such as methylcellulose, ethylcellulose, carboxymethylcellulose, and carboxymethylhydroxyethylcellulose; an alkaline alkali metal silicate having a molar ratio of $M_2O/SiO_2$ of 1 or above wherein M is an alkali metal atom; and natural gums such as guar, xanthan, and karaya. The viscosity-average molecular weight of the above-described water-soluble polymers is about 10,000 to about 25,000,000, with the preferred viscosity-average molecular weight being in excess of about 1,000,000. The preferred partially hydrolyzed polyacrylamides have about 12 to about 67 percent of the carboxamide groups hydrolyzed to carboxyl groups. When employed, about 0.2 to about 2 weight percent water-soluble thickening agent in finely divided particulate form is usually suspended in the petroleum base overflush fluid.

Further details regarding the oil-soluble thickening agent- and solid particulate water-soluble thickening agent-containing petroleum base liquid are described in U.S. Pat. No. 4,191,249, which patent is incorporated herein in its entirety by reference.

Generally, at least about 1 to about 10, preferably about 5, barrels/foot of treated subterranean formation of overflush fluid is injected into the well. This volume of overflush fluid is usually sufficient for the injected overflush fluid to substantially fill the pore volume in the treated subterranean formation within a radius of about 20 to about 25 feet from the well. When the imbibition oil recovery process of the present is repeated, the volume of injected overflush fluid is typically consecutively increased at a rate of about an additional 0.5 to about 5, preferably about 1 to about 2.5, barrels/foot of treated subterranean formation per repetition (i.e., at a rate sufficient to progressively fill about an additional 5 to about 10 radial feet of pore volume of treated subterranean formation per repetition). Accordingly, during the first repetition of process of the present invention, about 1.5 to about 12.5, preferably about 6 to about 7.5, barrels/foot of treated subterranean formation of overflush fluid is injected into the well to substantially fill the pore volume in the treated subterranean formation within a radius of about 25 to about 35 feet from the well. When the overflush fluid comprises a series of sequentially injected fluids, the total volume of all the fluids employed in the series usually lies within the above noted volumes, with the volumetric ratios of the different slugs commonly being within the ratios taught in the respective, above-identified patents.

In one version of the invention, after injecting the wettability reversal agent-containing fluid and prior to the injection of the overflush fluid, a hot aqueous fluid (e.g., heated water or steam) is injected through the well and into at least a portion of the fractured, oil-bearing subterranean formation. The volume of the hot aqueous fluid injected in this embodiment of the invention is generally at least the same as the volume of the injected wettability reversal agent-containing fluid. Preferably, the volume of injected hot aqueous fluid is at least about twice, more preferably at least about five times, and most preferably at least about 10 times, the volume of the injected wettability reversal agent-containing fluid. Typically, the volume of the injected hot aqueous fluid is less than about 100, and preferably less than about 75, more preferably less than about 50, and most preferably less than about 25, times the volume of the injected wettability reversal agent-containing fluid.

After injecting the overflush fluid, the well is shut-in for a period of time prior to being placed into production. The shut-in period is usually at least about one day, with a five day period being more typical. Generally, the well is returned to production within about a month, and preferably within about two weeks.

When put into production, oil is typically produced from the well using a steam huff-n-puff enhanced process.

The effectiveness of the process of the present invention can be monitored by measuring the oil produced from the treated well. In addition, diagnostic tests can be performed before and after each treatment. Exemplary diagnostic tests include, but are not limited to, (a) injection profile, (b) one rate and two rate pressure fall-off tests (which determine the well and reservoir conditions and the presence or absence of oil banks), (c) cross well seismic tomography or vertical seismic profile (which maps the reservoir structure and the movement of heated zones and oil banks), and (d) log inject log (which determines the vertical oil saturation distribution in the well).

The process of the present invention enhances the recovery of oil from a fractured, oil-bearing subterranean formation, especially when used in conjunction with a steam huff-n-puff process. Typically, the well is subjected to one or more steam huff-n-puff process cycles and then the process of this invention. This process combination is repeatable as long as oil recovery is economically feasible. Each time the combined processes are repeated, the volume of injected wettability reversal agent-containing fluid is generally increased to extend the improved imbibition oil recovery further into the formation. Eventually, the process of the present invention is replaced with a conventional steam drive process, the oil in the formation then being displaced to and produced at other production wells.

EXAMPLES

The following examples are intended to illustrate—and not limit—invention.

EXAMPLE 1

Control Experiment

Rock bits (3 gm) from a well penetrating a Monterey subterranean formation were saturated with heavy oil and then placed in a centrifuge tube of the type usually used to determine the cream content of milk. The centrifuge tube was filled with pH 7 water and allowed to equilibrate at about 81.7° C. (about 179° F.) for about five days. No oil rose to the top of the centrifuge tube neck. Thus, the oil recovery by imbibition was 0%.

EXAMPLE 2

Experiment Illustrating Efficacy Of Present Invention

Example 1 was repeated except that the pH of the water was raised to over 13. The oil recovery by imbibition was found to be about 44.1% after about five days of equilibrating at about 81.7° C. (about 179° F.).

A comparison of Examples 1 and 2 indicates that the process of the present invention is capable of significantly increasing the recovery of oil from an oil-bearing subterranean formation by imbibition.

EXAMPLE 3

Enhanced Imbibition Huff-n-Puff Process

A well penetrating a fractured, oil-bearing subterranean formation is subjected to a steam huff-n-puff process with diminishing returns. To counteract this trend, a sodium orthosilicate slug having a pH of about 13 is injected into the well. The volume of injected fluid is about 0.02 barrel per cubic foot of volume of the subterranean formation intended to be treated by the process of this invention. Next, steam (generated using about 0.01 barrel per cubic foot of treated volume of the subterranean formation) is injected into the well. A diesel oil overflush fluid (about 5 barrels per foot of treated subterranean formation) is then injected into the well. After shutting in the well for a period of about 2 to about 3 weeks to allow the injected fluids to soak into the fractured matrix of the formation, the well is then placed on production using a steam huff-n-puff process to produce oil from the well.

Although the present invention has been described in considerable detail with reference to some preferred versions, other versions are possible. Therefore, the spirit and scope of the appended claims should not necessarily be limited to the description of the preferred versions contained herein.

What is claimed is:

1. A method for enhancing the production of oil from a fractured, oil-bearing subterranean formation, the method comprising the sequential steps of:
    (a) injecting a slug of a fluid containing a wettability reversal agent through a well and into at least a portion of a fractured, oil-bearing subterranean formation, the wettability reversal agent being capable of changing at least a portion of the matrix face of the oil-bearing subterranean formation from preferentially oil wet to preferentially water wet;
    (b) injecting a slug of an overflush fluid through the well and into at least a portion of the fractured, oil-bearing subterranean formation, the overflush fluid being capable of increasing the oil mobility and decreasing the water mobility in at least a portion of the fractured, oil-bearing subterranean formation; and
    (c) placing the well into production.

2. The method of claim 1 wherein the fractured, oil-bearing subterranean formation comprises a tectonically fractured, oil-bearing subterranean formation.

3. The method of claim 1 wherein the fluid injected in step (a) comprises an aqueous liquid.

4. The method of claim 1 wherein the overflush fluid injected in step (b) comprises a hydrocarbon oil.

5. The method of claim 1 wherein the overflush fluid injected in step (b) comprises a diesel oil.

6. A method for enhancing the production of oil from a fractured, oil-bearing subterranean formation, the method comprising the sequential steps of:
    (a) injecting a slug of a fluid containing a wettability reversal agent through a well and into at least a portion of a fractured, oil-bearing subterranean formation;
    (b) injecting a hot aqueous fluid through the well and into at least a portion of the fractured, oil-bearing subterranean formation;
    (c) injecting a slug of an overflush fluid through the well and into at least a portion of the fractured, oil-bearing subterranean formation, the overflush fluid being capable of increasing the oil mobility and decreasing the water mobility in at least a portion of the fractured, oil-bearing subterranean formation; and
    (d) placing the well into production.

7. The method of claim 6 wherein the fluid injected in step (a) comprises an aqueous liquid.

8. A method for enhancing the production of oil from a fractured, oil-bearing subterranean formation, the method comprising the sequential steps of:
    (a) injecting a slug of a fluid containing a wettability reversal agent through a well and into at least a portion of a fractured, oil-bearing subterranean formation, the wettability reversal agent being selected from the group consisting of alkaline alkali metal silicates, ammonium salts, alkali metal hydroxides, alkali metal tripolyphosphates, alkali metal carbonates, alkali metal bicarbonates, and mixtures thereof;
    (b) injecting a slug of an overflush fluid through the well and into at least a portion of the fractured, oil-bearing subterranean formation, the overflush fluid being capable of increasing the oil mobility and decreasing the water mobility in at least a portion of the fractured, oil-bearing subterranean formation; and
    (c) placing the well into production.

9. The method of claim 8 wherein the fractured, oil-bearing subterranean formation comprises a tectonically fractured, oil-bearing subterranean formation.

10. The method of claim 8 wherein the overflush fluid injected in step (b) comprises a hydrocarbon oil.

11. The method of claim 8 wherein the overflush fluid injected in step (b) comprises a diesel oil.

12. The method of claim 8 wherein the overflush fluid injected in step (b) comprises (i) a hydrocarbon oil, (ii) an oil-soluble thickening agent, and (iii) a water-soluble thickening agent.

13. The method of claim 8 wherein the liquid phase of the fluid injected in step (a) has a pH of at least about 11.

14. A method for enhancing the production of oil from a fractured, oil-bearing subterranean formation, the method comprising the sequential steps of:
    (a) injecting a slug of a fluid containing a wettability reversal agent through a well and into at least a portion of a fractured, oil-bearing subterranean formation, wherein the fluid injected in step (a) comprises steam;
    (b) injecting a slug of an overflush fluid through the well and into at least a portion of the fractured, oil-bearing subterranean formation, the overflush fluid being capable of increasing the oil mobility and decreasing the water mobility in at least a portion of the fractured, oil-bearing subterranean formation; and (c) placing the well into production.

15. A method for enhancing the production of oil from a fractured, oil-bearing subterranean formation, the method comprising the sequential steps of:
 (a) subjecting a well to at least one steam huff-n-puff cycle;
 (b) injecting a slug of a fluid containing a wettability reversal agent through the well and into at least a portion of a fractured, oil-bearing subterranean formation;
 (c) injecting a slug of an overflush fluid through the well and into at least a portion of the fractured, oil-bearing subterranean formation, the overflush fluid being capable of increasing the oil mobility and decreasing the water mobility in at least a portion of the fractured, oil-bearing subterranean formation; and
 (d) placing the well into production.

16. A method for enhancing the production of oil from a tectonically fractured, oil-bearing subterranean formation, the method comprising the sequential steps of:
 (a) injecting a slug of an aqueous fluid containing a wettability reversal agent through a well and into at least a portion of a tectonically fractured, oil-bearing subterranean formation, the wettability reversal agent being selected from the group consisting of alkaline alkali metal silicates, ammonium salts, alkali metal hydroxides, alkali metal tripolyphosphates, alkali metal carbonates, and alkali metal bicarbonates;
 (b) injecting a slug of an overflush fluid through the well and into at least a portion of the tectonically fractured, oil-bearing subterranean formation, the overflush fluid being capable of increasing the oil mobility and decreasing the water mobility in at least a portion of the tectonically fractured, oil-bearing subterranean formation; and
 (c) placing the well into production.

17. The method of claim 16 wherein the method further comprises the step (a.1) of injecting a hot aqueous fluid through the well and into at least a portion of the fractured, oil-bearing subterranean formation after step (a) but before step (b).

18. The method of claim 16 wherein prior to step (a) the well is subjected to at least one steam huff-n-puff cycle.

19. The method of claim 16 wherein after step (c) the well is subjected to at least one steam huff-n-puff cycle.

20. The method of claim 16 wherein the liquid phase of the aqueous fluid injected in step (a) has a pH of at least about 11.

* * * * *